United States Patent
McCauley

(10) Patent No.: US 6,287,198 B1
(45) Date of Patent: Sep. 11, 2001

(54) OPTICAL GUN FOR USE WITH COMPUTER GAMES

(76) Inventor: Jack J. McCauley, 1 Jillian Way, Danville, CA (US) 94506

( * ) Notice: Subject to any disclaimer, the term of this patent is extended or adjusted under 35 U.S.C. 154(b) by 0 days.

(21) Appl. No.: 09/366,390

(22) Filed: Aug. 3, 1999

(51) Int. Cl.$^7$ .................................................. G06F 13/15
(52) U.S. Cl. ................................ 463/37; 463/36; 463/38; 710/3; 710/15
(58) Field of Search ..................................... 463/2, 36–39, 463/50–52; 345/27, 28, 156, 158, 192, 193, 207; 710/3, 15, 30, 46, 63

(56) References Cited

U.S. PATENT DOCUMENTS

| 4,157,182 | * | 6/1979 | Levine .................................. 463/52 |
| 4,813,682 | * | 3/1989 | Okada .................................... 463/5 |
| 4,922,420 | * | 5/1990 | Nakagawa et al. .................. 463/29 |
| 5,926,168 | * | 7/1999 | Fan ..................................... 345/158 |
| 5,958,020 | * | 9/1999 | Evoy et al. ............................ 710/3 |
| 5,999,171 | * | 10/1999 | Goff et al. .......................... 345/180 |
| 6,146,278 | * | 11/2000 | Kobayashi ............................. 463/53 |
| 6,171,190 | * | 1/2001 | Thanasack et al. .................... 463/51 |
| 6,178,514 | * | 1/2001 | Wood .................................. 713/200 |

* cited by examiner

*Primary Examiner*—Mark Sager
*Assistant Examiner*—John M Hotaling
(74) *Attorney, Agent, or Firm*—Patrick Reilly

(57) ABSTRACT

An optical gun for use in combination with computer game and computer simulation systems is provided. The optical gun includes a pistol shaped chassis, a USB computer control circuit, an optical sensor, a set of manual buttons, a trigger, a thumbpad, an optical wheel and a hardware accelerator. A game player grasps the pistol shaped chassis with one hand around a hand grip, while supporting a barrel section with a second hand. The optical wheel is located on the barrel and is manipulated by the player's second hand. The player points the barrel at a video screen of a game system. A pull of the trigger indicates that the player has fired a simulated round within a simulation context. Turns of the optical wheel indicate movement of the game player's virtual location within a simulated game space or volume. The player may press against the thumbpad or actuate one of the buttons to communicate movement within the game scenario, or to transmit other instructions to the computer simulation system. The controller receives information from the game system that specifies the pixel illumination data sequence of the video screen. Alternatively, the optical gun may generate a pixel illumination sequence and thereby impose a screen flash on the video screen via the hardware accelerator. The controller calculates the position of the video screen at which the optical gun was pointed by comparing the time of illumination detection reported by the optical sensor within the period of time that the trigger was pulled against the pixel illumination sequence pattern information provided by the game system. The controller then transmits the calculated position on the screen at which the simulated round firing was intended, and any manipulation or activation of the buttons, the optical wheel or the thumbpad, to the host computer. The game system thereupon integrates the game player's inputs regarding virtual movement within the simulated game space or volume and the simulated firing of rounds within the context of the game simulation. The game player may thus ergonomically explore and interact within a simulated two or three dimensional game space. The optical gun and the game system may incorporate USB Bus and Human Interface Device, or HID, standards into their design, use and architecture.

8 Claims, 4 Drawing Sheets

OPTICAL GUN FOR USE WITH COMPUTER GAMES

FIELD OF INVENTION

The present invention relates to the interaction of a game player with a computer generated game scenario. More particularly, the present invention relates to the use, design and application of manually operated input devices used in combination with computer simulation systems and computer games.

BACKGROUND OF INVENTION

The computer entertainment industry annually publishes numerous games and simulations for the amusement of the general public. Most conventional computer games can be classified as either cinematic or contextual. Cinematic games dynamically present a series of cartoon or video images in a substantively predetermined order such that the game player is led through an essentially prescribed game course. Contextual games allow the player to more significantly alter the course of a game session in response to decisions made by the player and communicated to the game system via user input devices. Contextual games typically allow the game player to act within a simulated three dimensional space. A contextual game software program therefore usually requires the transmission of three dimensional positional information as well as commands that indicate a user-selected direction of travel, as defined within the simulated three dimensional game space, from the user input device and to a game system host computer.

The development of ergonomic user input devices is clearly an important aspect of computer simulation evolution. The useability of buttons, triggers, joysticks, optical guns, thumbpads and other input devices significantly affect the degree to which a player may enjoy a particular game system. And the architecture of the player input device and its method of integration into a game system can appreciably contribute to the cost of manufacturing the game system.

Many computer game systems using an optical gun need to reliably and accurately determine at what area of the video screen the optical gun is pointed when the trigger is depressed by the game player. Certain conventional art games generate a screen flash to address this requirement. In a screen flash, the majority of the pixels of the video screen are de-energized while each or most of the pixels are alternately and briefly illuminated in a predetermined sequence. This screen flash method requires a controller to compare the timing of the detection of pixel illumination by the optical gun, coincident with the depression of the trigger, with the illumination sequence data, whereby the controller calculates the location of the screen at which the optical gun was pointed shortly after the trigger was fired. In another application of screen flash, the computer game system may generate a screen flash to determine where the optical gun is pointed at a given moment, irrespective of trigger firing. This may occur when a game scenario allows for a simulation of game features in a 360 degree circumference around the position of the game player in the game space, and the pointing of the gun may be used to control what portion of the 360 degree circumference will be displayed on the video screen, so that a player might simulate physically turning around within a setting of a game scene. Conventional applications of the screen flash method present significant drawbacks, to include (1) a flashing of the screen at rates slow enough to be perceived as an annoyance by the game player, and (2) illumination of the pixels at a low power whereby less power whereby less expensive optical guns may intermittently fail to detect pixel illuminations during the screen flash.

The development and inclusion of input device communication formatting standards in personal computer operating systems, such as the human interface device, or HID, standard substantively incorporated into MICROSOFT WINDOWS 2000 operating system, MICROSOFT WINDOWS 98 operating system, APPLE OS 8.0 operating system and LINUX operating system offer a potential unrealized by the prior art to streamline player input device designs, reduce game system hardware costs and economically provide higher quality computer games to arcade operators and game players.

An interpretive software module of the host computer system software contains and implements a library of pre-defined peripheral device archetypes, data structure building rules and signal handling protocols. The data structure building rules direct the construction of peripheral device-specific data structures. The construction of each peripheral device-specific data structure is determined by an interpretation of the system software of a self-descriptive formatted data packet, such as a HID report descriptor, that describes a particular peripheral device. The formatted self-descriptive data packet relates the personality or archetype of the originating peripheral device to a particular archetype model structure contained in the interpretive software module, and typically further describes individual design elements, and the nature and relatedness of the elements, of the peripheral device within the context of the referenced archetype model. The interpretive software module may then employ the data structure building rules to construct a device-specific data structure upon the bases of the pre-defined form of the designated archetype and the specific description, if applicable, of the individual design elements of the selected peripheral device. More particularly, the personal computer software operating systems mentioned above, i.e. the LINUX operating system, MICROSOFT WINDOWS 2000 operating system, WINDOWS 98 operating system and APPLE OS 8.0 operating system, substantively incorporate and/or conform to individual principles, concepts and/or specifications found in the Human Interface Device standard, as described in "The Device Class Definition for Human Interface Devices, Firmware Specification", Version 1.0—Final, USB Implementers Forum, 1997. The Human Interface Devices, or HID, standard teaches that certain host computers and personal computers may be programmed to accept and/or transmit formatted self-descriptive information packets, or HID report descriptors, and peripheral state data, or HID reports, to and/or from HID compliant peripheral input, output and bidirectional devices. The use of predetermined formats for communication and control between the host computer and the peripheral devices is supports the vigorous commercial and consumer implementation of plug-and-play computer system modules, whereby a computer user may purchase a HID device with a high degree of confidence that the newly acquired HID device will be easily integrated into his or her computing system.

There is, therefore, a long felt need to both improve the ergonomic quality of input devices of computer game systems and to allow the cost-effective application of personal computer models in combination with input devices that provide user generated commands and direction to either a cinematic type or contextual style computer game.

OBJECTS OF THE INVENTION

It is therefore an object of the present invention to provide an apparatus that enables the interaction of an end-user with a computer game system.

It is another object of the present invention to translate hand and finger motions of a computer game player into digital command data for use within a computer simulation or game.

It is a further object of the present invention to provide a manually operated apparatus that transmits user commands and selections within a computer simulation to a computer game system.

It is yet another object of the present invention to provide a manually operated apparatus used in combination with computer game systems that allows cost effective embodiments of computer game system designs.

SUMMARY OF INVENTION

The present invention provides an apparatus, or optical gun and a method to employ the optical gun in combination with a computer game system, wherein the optical gun, or light gun, translates hand and finger motions of an operator, user or game player into commands, status signals and user selections that are interpreted to be meaningful by a host computer of the computer game system within the context of a computer simulation or game to the host computer.

A preferred embodiment of the method of the present invention includes a pistol shaped chassis, chassis signal cabling, a USB computer control circuit or controller, an optical sensor, a trigger, a plurality of buttons, an optical wheel, an analog or digital thumbpad or thumbpads, a video sampling cable, a hardware accelerator and a USB bus. The pistol shaped chassis includes a hand grip and a barrel section, and secures and locates the optical sensor, the plurality of buttons, the trigger, the optical wheel and the analog thumbpad in or on the chassis itself. The chassis signal cabling provides a communication pathway from the optical sensor, the plurality of buttons, the trigger, the optical wheel and the analog thumbpad and to the USB computer control circuit. The USB bus is connected to the USB computer control circuit and extends from USB computer control circuit to the host computer. The video sampling cables passes video data from the host computer to both the USB computer control circuit and a video monitor of the computer game system In operation the optical gun may be manually pointed by the game player at a video monitor, an NTSC television or other suitable video television device known in the art, of a computer simulation or game system. The USB bus provides a communication and power pathway between the control circuit and the computer game system. The optical sensor detects the occurrence of video monitor pixel illumination and transmits this occurrence to the control circuit via the chassis signal cabling. The USB computer control circuit, or control circuit, compares the time sequence of the video data, or video screen sequential pixel illumination data, as received from the host computer via the video sampling cable, and therefrom calculates the location of the video screen at which the optical sensor was pointed proximate to the time that a pixel illumination was detected. The control circuit then informs the host computer of the X-Y dimensional position on the screen of the instantaneous aim of the optical gun simultaneous to a pulling or enablement of the trigger by the player.

The optical wheel and thumbpad are positioned for manual manipulation by the game player. A rotation of the optical wheel by the game player is interpreted in certain preferred embodiments of the present invention as an indication movement of the game player's orientation along a third physical dimension, or Z axis, of the simulated space of a computer game scenario. As an example, rotation of the optical wheel in a nominal clockwise direction might indicate motion of the game player's orientation along the Z axis in a positive direction, and rotation of the optical wheel in a reverse, nominal counter clockwise rotation might indicate motion of the game player's orientation in a negative direction along the Z axis.

In certain preferred embodiments of the present invention a second thumbpad may transmit additional player instructions to the controller, such as to enable a simulation up-down, left-right range of motion of a player's head within a game scenario.

Alternatively and similarly, manipulation of, to include the application of physical pressure to, the thumbpad by the game player is interpreted in certain preferred embodiments of the present invention as positional or other data communicated by the game player and interpreted by the computer game system within the context of a selected computer game scenario.

The buttons of the optical gun may optionally be used for transmission of programming instructions or other game instructions by the game player to the computer game system via the control circuit.

The trigger may be used to indicate the simulated firing by the player of a round, such as a bullet, missile or tagging object or signal, within the context of a computer game.

Certain alternate preferred embodiments communicate self-descriptive formatted data packets substantively formatted in accordance with the Human Interface Device standard to the host computer over a Universal Serial Bus, or USB.

In certain other preferred embodiments that are substantively HID compliant, an operating system of the controller is formatted or preprogrammed to provide appropriate HID report descriptors and HID reports to the host computer. A HID report descriptor corresponding to a HID peripheral archetype, that relates to the expected HID peripheral class or type that is descriptive of the optical gun, is then created and transmitted to the host computer by the optical gun controller. The controller will accept data transmitted from the optical sensor, the thumbpad, the trigger, the optical wheel, and video data provided by the host computer. The controller will therefrom determine the X, Y and Z position of the orientation of the game player within the simulated game space, note the occurrence of any actuation of the trigger or the optical wheel and/or the thumbpad, and then transmit the calculated static and dynamic information of the game player's orientation within the simulated game space, and the additional commands and information communicated by the game player via the optical wheel and the trigger, to the host computer within a HID format compliant message or messages. The host computer will then interpret the information transmission from the optical gun controller and incorporate the transmitted information into the software program flow of the computer game.

In operation, the game player may grasp the hand grip of the pistol chassis with a first hand, while placing the forefinger of the first hand proximate to the trigger. The game player might then simultaneously place his or her second hand around an optical wheel located on the barrel section. The player might then point the optical gun at a video screen of the computer game system. The control circuit will locate the focus of the optical game within the X and Y axes of the video screen by means of interpreting the detection of pixel illumination in time synchronization with the video screen pixel illumination sequence information provided by the host computer of the game system. Alternatively or complementarily, the player might apply pressure to the thumbpad or buttons and thereby signal positional choices or decisions, relevant and meaningful within the game, to the computer game system. The moment of the detection of the illumination of the area of the screen upon which the optical gun is instantaneously focused or pointed is computationally related to and interpreted by the controller to determine the location of the pixels on the video screen that were illuminated by a screen flash cycle. The determination of the correspondence of the time of pixel illumination detection with the screen flash sequencing data allows the controller to determine where the game player is pointing the gun within the X and Y plane of the video screen proximate to the time of the screen flash and often proximate to the time of a trigger actuation.

The game player may also communicate movement of his or her position along the Z axis, or other axis, of the simulated game space by manipulation of the optical wheel. The game player may additionally actuate the trigger with his or her forefinger to communicate firing or tagging commands to the game system software. Alternatively or complementarily, the player might apply pressure to the thumbpad, or otherwise manipulate the thumbpad, to communicate movement of his or her position along the Z axis, or other axis, of the simulated game space.

Manipulation or depression of a button may also communicate actions or choices by the game player that are uniquely relevant within the process of a particular computer game.

In certain preferred embodiments, the controller incorporates the signals and data received from the trigger, the thumbpad, the buttons, the optical wheel and the host computer. The controller reads the video sequencing information provided by the host computer, calculates certain X, Y and Z positional and movement values from the information provided by the host computer, the optical sensor, the thumbpad and the optical wheel, and then formats the relevant video screen area location as calculated, any reported optical wheel movement, thumbpad pressure applications and other information into a HID formatted report. The HID report is then transmitted over to the host computer, possibly via a USB compliant signal and power cable.

In certain alternate preferred embodiments the USB computer control circuit may initiate a screen flash of the video screen by providing a sequence of pixel illumination data to the hardware accelerator and directing the hardware accelerator to drive the pixel illumination data to the video screen. The pixel illumination sequence instructions to the video screen to sequentially impose a bright flash of certain screen pixels in a prespecified order. The control circuit of the optical gun may thereby momentarily and optionally exclusively drive the video or television by supplying video data and/or electrical power, to include the pixel illumination sequence, to the video or television. This optional capability of certain preferred embodiments of the present invention may result in improving the rate at which pixels of the video or television are sequentially flashed and/or increase the intensity of the brightness of the pixels, whereby the detection rate and detection reliability of the illuminated pixels by the optical gun is increased, and/or the activity of sequentially illuminating the video or television screen pixels is less noticeable to the game player. As it is a common conventional practice to sequence a screen flash through the video or television screen at rates as low as 15 Hertz, a reduction of annoyance of the game player caused by this conventional practice is of value in many computer game systems. In one prominent application of this optional capability, the control circuit may drive the video monitor with a screen flash wherein the pixels of the video monitored are alternately illuminated according to a defined sequence on the occasion of a trigger firing or actuation, or upon request by the computer game system. The need for this optional capability lies in the usefulness of the control circuit to accurately and reliably determine at what part of the video screen the optical gun is pointed when the game player depresses the trigger. In the conventional art, the game system will react to a firing of the optical gun by the game player by cycling a sequence of pixel illuminations through the video screen at rates on the order of 15 Hertz and with insufficient power levels to generate pixel illuminations sufficiently intense for reliable detection by the optical gun. The optional hardware accelerator of the present invention accepts a power signal from the signal and power cabling and delivers the power through one or more video data lines and to the video monitor. The control circuit may thereby cause a screen flash upon certain conditions, such as when the trigger is depressed or upon a request by the computer game system. The computer game system may request a screen flash in order to determine where on the video screen the optical gun is instantaneously pointed for the purposes of managing the game process.

In certain alternate preferred embodiments of the present invention optical gun communicates to and/or from an analog game port of the host computer. The standard analog game port included in certain personal computer architectures compatible with certain standards published by INTERNATIONAL BUSINESS MACHINES, INC. may be used in this regard. In certain of these alternate preferred embodiments of the optical gun a software post processor module of the host computer translates the data transmitted by and/or to the optical gun whereby the information generated by the optical gun is reformatted for correct interpretation by the computer game system or optical gun controller and applied within the context of a specified computer game, and/or data transmitted by the computer game system and to the optical gun may be reformatted for correct interpretation by the optical gun.

In certain still alternate preferred embodiments of the optical gun a watchdog circuit will reset the control circuit if an expected electrical signal or electrical activity is not received or observed by the watchdog circuit from the control circuit within a prespecified time period. This watchdog feature provides for a more robust integration of the optical gun with the computer game flow, whereby the optical gun may be quickly reset upon an occurrence of certain malfunctions of the controller.

In certain yet alternate preferred embodiments of the optical gun the analog output of the analog thumbpad is transmitted from the USB computer circuit to the analog game port of the host computer, by which means the optical gun is useful in a backward compatible mode with certain non-USB bus and/or HID formatting standards. The player may thereby supply analog game playing responses and inputs to the computer game system via the analog or digital thumbpad.

DETAILED DESCRIPTION OF A PREFERRED EMBODIMENT

Figure 1:
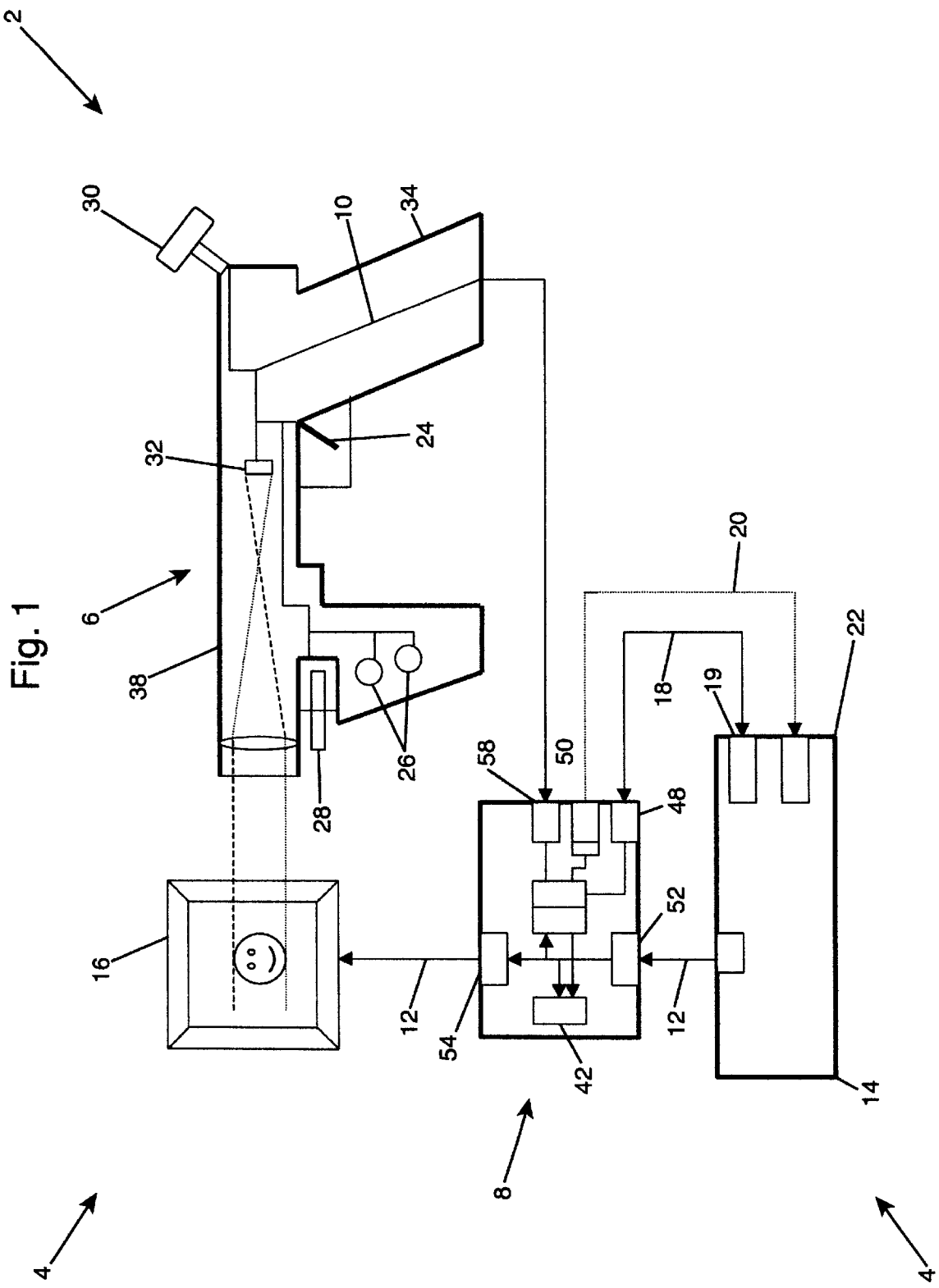
FIG. 1 is a schematic representation of an optical gun in combination with a computer game system.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

The terms television, video, video device, video monitor and video screen are defined within this disclosure to denote any suitable video display device or television known in the art. The term personal computer designates herein suitable personal computers, such as certain compatible personal computers, made in accordance with suitable standards published by INTERNATIONAL BUSINESS MACHINES, INC, suitable APPLE POWERPC personal computers, playstations or other suitable personal computers known as art. computer 14 of the computer game system 4 and to a video screen 16 of the computer game system 4, a USB bus 18 bi-directionally connecting the host computer 14 of the computer game system 4 to the USB computer control circuit 8 and an analog game port cable 20 for transmitting analog electrical signals from the USB computer control circuit 8 to an analog game port 22 of the host computer 14 via an analog signal pathway 20.

The video sampling cable 12 comprises three video data lines 12A, 12B & 12C, a horizontal sync line or H sync line 12D and a vertical sync line or V sync line 12E. The three video data lines 12A, 12B & 12C may respectively and separately transmit illumination power from the host computer and to red, green and blue pixel sets of the video screen.

Forming the USB computer control circuit 8 as a separate module 8 located several inches from the chassis 6 avoids a potential need for a transceiver circuit for the reduction or elimination of signal reflections and electrical interference among the components of the chassis 6 and the USB computer control circuit 8. This obviation of need for a transceiver is a meaningful cost saving in the context of consumer game system economics. Locating the USB computer control circuit 8 separate from the chassis 6 also reduces the weight borne by the player when handling the chassis 6.

A trigger 24, a plurality of buttons 26, an optical wheel 28, an analog thumbpad 30 and an optical sensor 32 are attached to the chassis 6. The host computer 14 of the computer game system 4 transmits pixel illumination data and power, and V sync and H sync signals, to the video screen 16 of the host computer 4 via the video sampling cable 12. The video sampling cable 12 additionally transmits the pixel illumination data from the host computer 4 and to the USB computer control circuit 8. The USB computer control circuit 8 may thereby compare the occurrence of a trigger pull, a button depression, an optical wheel rotation or a pressing of the thumbpad 30 with the timing of an illumination detection by the optical sensor 32 and thereby determine at what X-Y position of the video screen 16 the optical gun 2 was pointed proximate to the occasion of the trigger pull, the button depression, the optical wheel rotation or the pressing of the thumbpad 30, or upon a request by the computer game system for a determination of an X-Y position of the video screen 16 at which the optical gun 2 is pointed.

The game player may grasp a trigger grip 34 of the chassis 6 with a first hand while holding a wheel grip 36 of the chassis 6 with a second hand. The player may pull or depress the trigger 24 located on the trigger grip 34 and press against the analog thumbpad 30 attached to the chassis 6. Simultaneously or separately, the player may press one or more of one or more of the plurality of buttons 26 located on the wheel grip 36 and manipulate or turn the optical wheel 28 located under a barrel 38 of the chassis 6.

Depressing one of the plurality of buttons 26 causes a button depression signal to be generated by the selected button 26 and electrically transmitted to the USB computer control circuit 8. Turning the optical wheel 28 causes a position report to be generated by the optical wheel 28 and transmitted to the host computer 14. Applying pressure against the thumbpad 30 causes a pressure report to be generated by the thumbpad 30 and transmitted to the host computer 14. Depressing or pulling the trigger 24 causes a firing report to be generated by the trigger 24 and transmitted to the host computer 14.

Reports or signals of depressions of the buttons 26, pulls of the trigger 24, turns of the optical wheel 28 and pressings of the thumbpad 30 are each distinctly transmitted to the USB computer control circuit 8 via the first signal pathway 10.

The game player may point the barrel 38 of the optical gun at the video screen 16 whereby the optical sensor 32 detects the illumination of an X-Y position of the video screen 16. The optical sensor 32 thereupon generates and transmits an illumination detection time signal via the first signal pathway 10 and to the USB computer control circuit 8. The USB computer control circuit 8 may thereupon compare an illumination detection report received from the optical sensor 32 with the pixel illumination sequence received from the host computer 14 to determine at what X, Y position of the video screen 16 the optical sensor 32 was pointed proximate to the detection of an illumination by the optical sensor 32. A screen flash pixel illumination sequence may be generated by the USB bus control circuit 8 and provided to a hardware accelerator 42, whereby the hardware accelerator 42 imposes a screen flash onto the video screen 16, and the USB computer control circuit 8 compares the time occurrence of the illumination detection by the optical sensor 32 with the sequential timing of the imposition of illumination of the pixels in a screen flash. The USB computer control circuit 8 may thereby cause a screen flash in response to a request by the computer game system 4, the depression of the trigger 24, the depression of one of the plurality of buttons 26, the manipulation of the optical wheel 28 or the pressing of the thumbpad 30.

Figure 2:
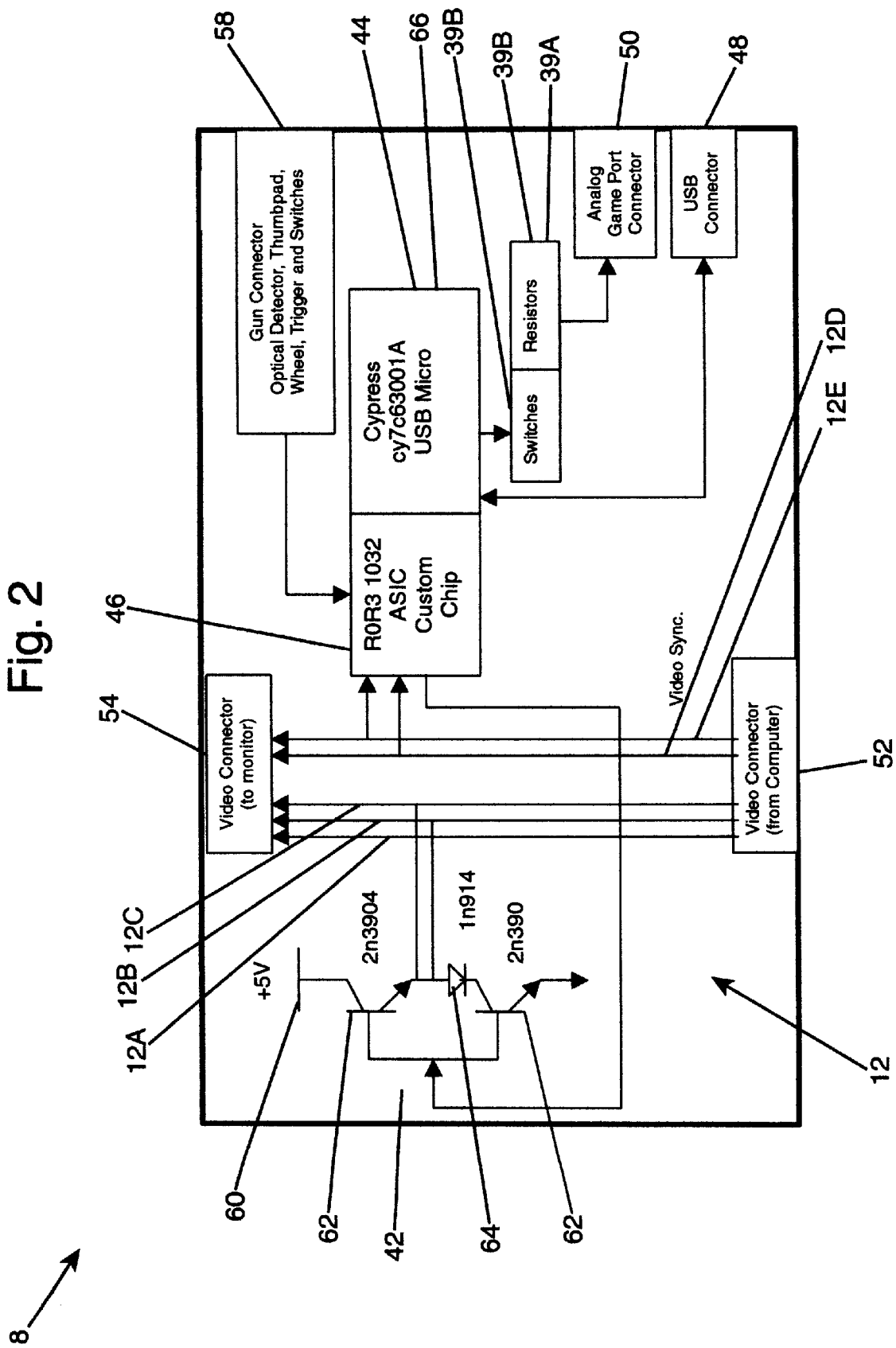
FIG. 2 is a schematic diagram of the USB computer control circuit of the optical gun of FIG. 1.

Referring now generally to the Figures, and particularly to FIGS. 1 and 2, the USB computer circuit 8 includes a Cypress Semiconductor USB microcomputer CY7C63001A 44, a Lattice Semiconductor ISPLSI1032 ASIC 46, the hardware accelerator 42, a USB bus connector 48, an analog game port connector 50 a first video connector 52, a second video connector 54 and a plurality 58 of connectors. The plurality of connectors 58 provide signal and status signal transmission from the optical sensor 32, the thumbpad 30, the trigger 24, the plurality of buttons 26, and the optical wheel 28 to the USB computer control circuit. The USB microcomputer 44 accepts status information and signals from the optical sensor 32, the optical wheel 28, the thumbpad 30, the trigger 24 and the plurality of buttons 26 via the ASIC 46. The USB microcomputer 44 calculates the X-Y position at which the optical gun 2 is pointed upon the basis of the video data, to include the case of a screen flash data instruction, and the time occurrence data of signals received from the optical sensor 32, the optical wheel 28, the trigger 24, the plurality of buttons 26 and the thumbpad 30.

The analog thumbpad 30 provides X, Y parameters to the game system that may separately designate left-right and up-down dimensions. The thumbpad 30 transmits X, Y data to the ASIC 46, from where the ASIC 46 transmits the received X, Y data to the USB computer 44. Where the analog thumbpad 30 is used to generate X, Y data for transmission to the analog game port 22, the ASIC 46 transmits digital representations of the X, Y data to a digital impedance converter 39. The digital impedance converter 39 incorporates a resistor network 39A with an analog switch multiplexor 39B wherefrom an analog X, Y signal is generated and transmitted to the analog game port 22 of the host computer 14.

In the case of a screen flash command by the USB microcomputer 8, the hardware accelerator 42 accepts a pixel illumination sequence from the ASIC 46 and generates screen flash signals that are transmitted via the video sampling cable 12 and to the video screen 16, whereby a screen flash is actuated by means of the ASIC 46 and the hardware accelerator 42. The hardware accelerator 42 includes a DC voltage source 60, a pair of 2n3904 transistors 62 and a 1n914 diode 64. The input of the hardware accelerator 42 accepts the pixel illumination sequence from the ASIC 46, while the output of the hardware accelerator 42 delivers voltage amplified pulses of the ASIC 46 transmitted video data to the lines 12A, 12B & 12C of the video sampling cable 12. The video data delivered to the hardware accelerator 42 may cause a screen flash. A screen flash pixel illumination sequence may be generated by the USB computer circuit 8 in combination with the ASIC 46 in response to a trigger pull or other signal generated by a component of the optical gun 2 or by an external command received from the computer game system 4.

The method of operation of the hardware accelerator 42 includes an initiation of a screen flash action by the USB microcomputer 44. The USB microcomputer 44 receives a HID report defining the resolution parameters of the video screen 16 from the host computer 14. The USB microcomputer 44 may initiate a screen flash due to data received from the input devices located on the chassis 6 or as a specific command from the host computer 14. The USB microcomputer 44 will inform the ASIC 46 to create a pixel illumination pulse formatted in accordance with the screen resolution parameters of the relevant HID report. The ASIC 46 then monitors the H sync 12D and V sync lines 12D to coordinate the issuance of a series of pixel illumination signals with the video frame data sequence that is transmitted from the host computer 14 to the video screen 16 via the video sampling cable. The ASIC 46 then provides a pulse input to the bases of the two transistors 62 of the hardware accelerator 42. A resultant formatted voltage output from the hardware accelerator 42 imposes a high voltage level on one or more of the video data lines 12A, 12B & 12C. In this manner the USB controller 8 creates a critically timed pixel illumination signal and delivers the pixel illumination signal via the video sampling cable 12 to the video screen 16. The method of the present invention thereby provides a faster rate of pixel illumination in a screen flash as compared to the prior art and creates a screen flash with reduced host computer intervention. The host computer 44 is not required to render a blank frame for the screen flash. Furthermore, the USB microcontroller 44 may tightly control screen flash actions and frequently couple screen flashes with commands sent by the host computer 14, whereby screen flashes are used more effectively within the game flow. The capability of the hardware accelerator 42 to impose screen flashes at faster then 100 Hz radically reduces any visual perception of the screen flash by the player and thereby enhances the enjoyment of the computer game.

The method of the present invention further allows for a calculation of focal compensation, whereby the X-Y locations of the group of pixels that are detected by the optical sensor 32 as illuminated during the screen flash may be captured and then analyzed by the USB microcomputer 44. The USB microcomputer may average the largest X value with the smallest X value to determine a central X value, and the USB microcomputer 44 may average the largest Y value with the smallest Y value to determine a central Y value, whereby the center of focus of the optical gun at the moment of the screen flash may be more accurately resolved.

Signals transmitted from the thumbpad 30 may be routed through the USB computer circuit 8 and to the analog game port 22 via the analog game port connector 50 and the analog game port cable 20. By this connection the optical gun 2 is made backward compatible with certain computer game systems that do not accept USB bus communications and/or do not accept HID formatted messages.

The USB microcomputer 44, or USB microcontroller 44, contains sufficient memory to enable the execution of the software program of the optical gun 2.

The USB micro computer 44 includes a watchdog circuit 66 that times out if not reset within a certain time period by the USB microcomputer 44. If the watchdog circuit 66 times out, the watchdog circuit 66 then transmits a reset signal to the USB microcomputer 44.

Figure 3:
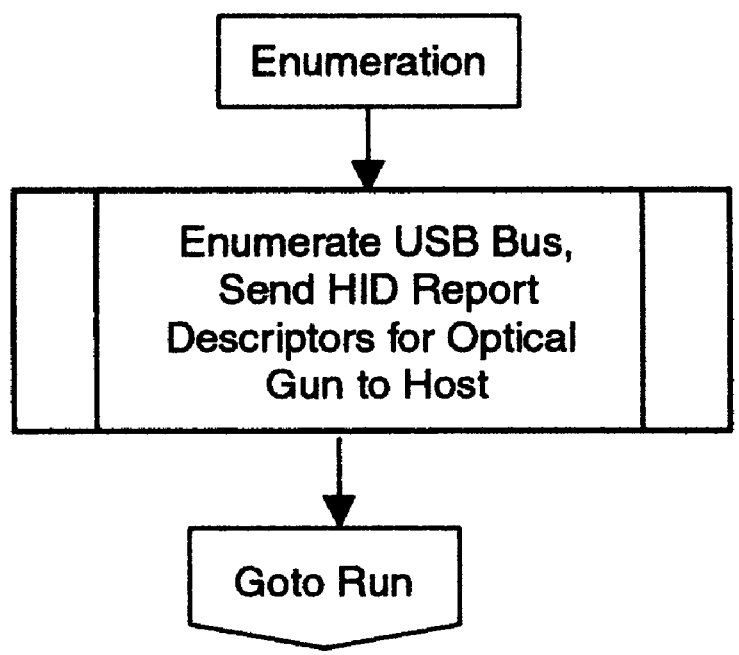
FIG. 3 is a software flowchart of an enumeration action as generated by the optical gun of FIG. 1.

Referring now generally to the Figures, and particularly to FIG. 3, an enumeration action may be initiated by the watchdog circuit 66 after the watchdog circuit 66 has timed out without receiving a reset signal from the USB microcomputer 44. The enumeration process includes the enumeration of the USB bus 18 and the transmission of HID descriptors from the optical gun 2 to the host computer 14.

Figure 4:
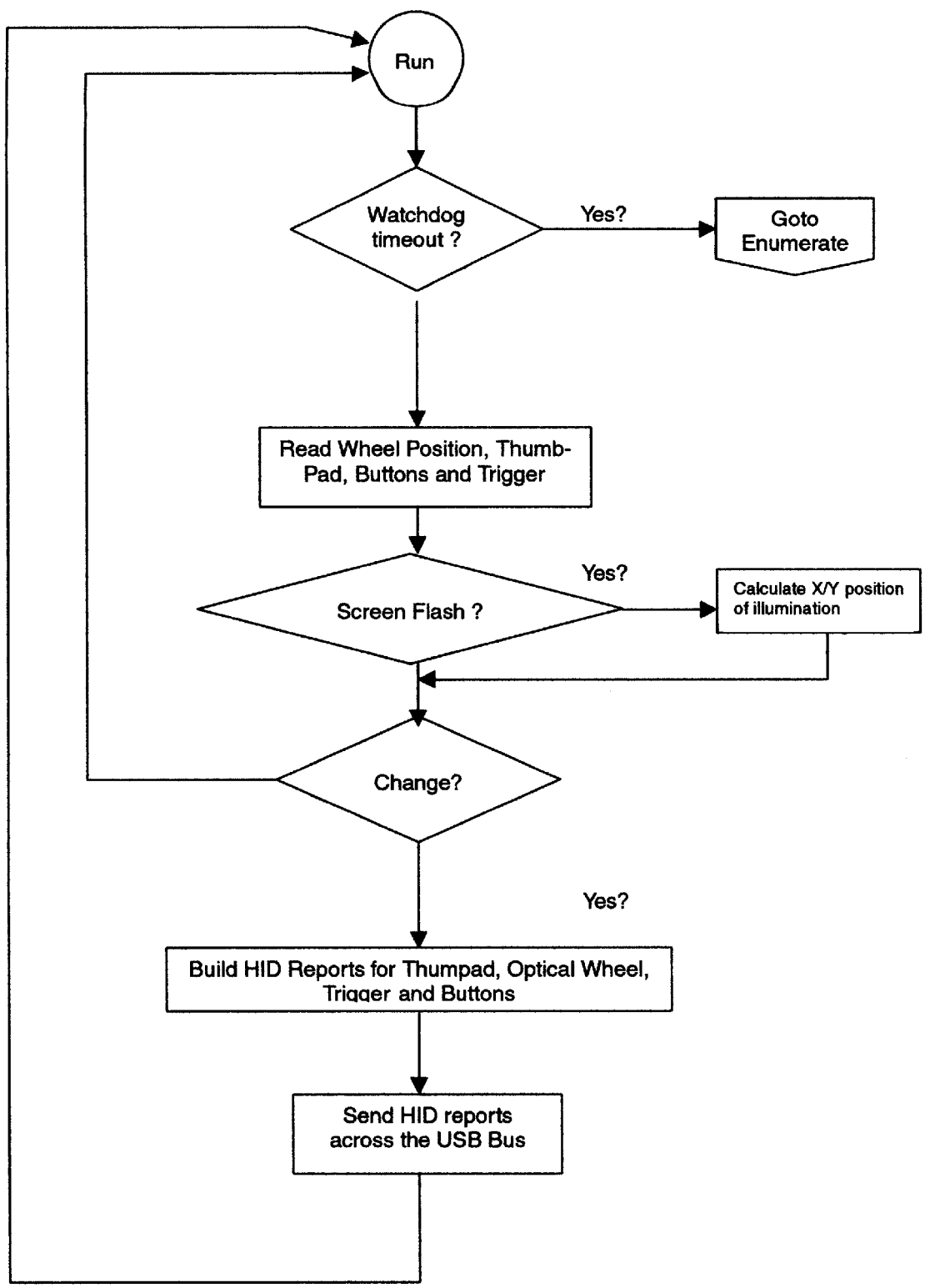
FIG. 4 is a software flowchart of a HID report generation as created by the optical gun of FIG. 1.

Referring now generally to the Figures, and particularly to FIG. 4, the software process of the optical gun 2 checks for a watchdog circuit time out and initiates an enumeration action, as described above, if a watchdog time out is detected. If no such time out is found, the optical gun 2 then examines the states of the optical wheel 28, the trigger 24, the thumbpad 30 and the buttons 26. If certain substantive changes of the optical wheel 28, the trigger 24, any button 26 or the thumbpad 30 is reported the USB computer control circuit 8, a screen flash is imposed via the hardware accelerator 42 by the USB microcomputer 44 and the ASIC 46, and the optical sensor 32 is monitored for detection of an illumination of an X-Y position of the video screen 16. If any substantive state change of the optical wheel 28, the trigger 24, any button 26 or the thumbpad 30 is seen by the optical gun 2, an appropriate HID report containing a description of the detected state change and any available and relevant X-Y position video screen illumination data is built by the USB microcomputer 44 and transmitted over the USB bus 18 to the host computer 14. If no state changes of the optical wheel 28, the trigger 24, any button 26 or the thumbpad 30 are seen by the optical gun 2 the optical gun software flow returns to checking for a time out of the watchdog circuit 66.

In operation of the preferred embodiment 2, a game player may grasp the trigger grip 34 of the chassis 6 with a first hand while supporting the barrel 38 with his or her second hand. A finger of the first hand may depress the trigger 24 or apply pressure to the thumbpad 30 while the optical wheel 28 may be manipulated by the second hand. The game player points the barrel 38 at the video screen 16 and thereby orients and controls the area of the video screen 14 at which the optical gun 2 is aimed. A trigger pull by the game player causes the USB computer control circuit 8 to impose a screen flash on the video screen 16. The USB microcomputer 44 thereupon calculates the X-Y position of the video screen 16 at which the optical gun 2 was pointed proximate to the time of the trigger pull. The USB computer control circuit 8 then creates a HID descriptor report containing the trigger pull event information and the X-Y position calculation.

The player may additionally rotate the optical wheel 28, or press against the thumbpad 30, or depress a button 26. Upon the occurrence of any one of these player actions the USB computer control circuit 8 builds a HID descriptor report containing information describing the reported user action and transmits the HID report to the computer game system 4.

The method of the present invention may be applied with host computers that are non-HID compliant, wherein a system software of the host computer provides the HID report descriptor and HID report functionalities by interpreting the significance of formatted data packets and formatted signal data according to a preestablished communications standard that includes a suitable knowledge-based data communications formatting protocol or technique known in the art.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

I claim:

1. An optical gun for use by a game player in combination with a computer game system, the computer game system having a host computer and a video screen and the computer game system running a computer software game, said optical gun comprising:

a universal serial bus compliant computer;

an optical sensor, said optical sensor detecting an illumination of a position located on the video screen, and said optical sensor transmitting a detection time signal to said universal serial bus compliant computer, said detection time signal containing information indicating a time of occurrence of detection of the screen position illumination;

a universal serial bus, said universal serial bus providing a bi-directional signal and power pathway between said universal serial bus computer and the host computer;

a video sampling cable, said video sampling cable receiving video screen data from the host computer and transmitting the video screen data to the video screen, and said universal serial bus compliant comparing a pixel illumination sequence of the video screen data with said time of occurrence of detection of the illumination as specified in said detection time signal, and determining therefrom the position of the video screen wherefrom said optical sensor detected the illumination, and said universal serial bus compliant computer generating a formatted report specifying the position, and said universal computer transmitting said formatted report to the host computer via said universal serial bus;

a chassis, and said optical sensor is affixed to said chassis; and a plurality of buttons, each of said plurality of buttons having an off state and a depressed state, each of said buttons transmitting a depression signal when passing from said off state and into said depressed state, and said universal serial bus computer generating a formatted report specifying said depression signals, and said universal serial bus computer transmitting said formatted report to the host computer via said universal serial bus.

2. An optical gun for use by a game player in combination with a computer game system, the computer game system having a host computer and a video screen and the computer game system running a computer software game, said optical gun comprising:

a universal serial bus compliant computer;

an optical sensor, said optical sensor detecting an illumination of a position located on the video screen, and said optical sensor transmitting a detection time signal to said universal serial bus compliant computer, said detection time signal containing information indicating a time of occurrence of detection of the screen position illumination;

a universal serial bus, said universal serial bus providing a bi-directonal signal and power pathway between said universal serial bus compliant computer and the host computer; and a video sampling cable, said video sampling cable receiving video screen data from the host computer and transmitting the video screen data to the video screen, and said universal serial bus compliant computer comparing a pixel illumination sequence of the video screen data with said time of occurrence of detection of the illumination as specified in said detection time signal, and determining therefrom the position of the video screen wherefrom said optical sensor detected the illumination, and said universal serial bus compliant computer generating a formatted report specifying the position, and said universal serial bus compliant computer transmitting said formatted report to the host computer via said universal serial bus;

a chassis, and said optical sensor is affixed to said chassis;

an optical wheel, said optical wheel attached to said chassis, and said optical wheel generating and transmitting a position report to said universal serial bus compliant computer, and said universal serial bus compliant computer generating a formatted report specifying said position report, and said universal serial bus compliant computer transmitting said formatted report to the host computer via said universal serial bus.

3. The optical gun of claim 2, wherein said chassis comprises a barrel and a grip, and said optical wheel is attached proximate to said barrel.

4. The optical gun of claim 3, wherein said chassis further comprises a motion detector, said motion detector sensing direction of motion and rate of motion of said chassis and transmitting a motion report to said universal serial bus compliant computer, said motion report indicating the direction of motion and rate of motion of said chassis as sensed by said motion detector.

5. An optical gun for use by a game player in combination with a computer game system, the computer game system having a host computer and a video screen and the computer game system running a computer software game, said optical gun comprising:

a universal serial bus compliant computer;

an optical sensor, said optical sensor detecting an illumination of a position located on the video screen, and said optical sensor transmitting a detection time signal to said universal serial bus compliant computer, said detection time signal containing information indicating a time of occurrence of detection of the screen position illumination;

a universal serial bus, said universal serial bus providing a bi-directional signal and power pathway between said universal serial bus compliant computer and the host computer;

a video sampling cable, said video sampling cable receiving video screen data from the host computer and transmitting the video screen data to the video screen, and said universal serial bus compliant computer comparing a pixel illumination sequence of the video screen data with said time of occurrence of detection of the illumination as specified in said detection time signal, and determining therefrom the position of the video screen wherefrom said optical sensor detected the illumination, and said universal serial bus compliant computer generating a formatted report specifying the position, and said universal serial bus compliant computer transmitting said formatted report to the host computer via said universal serial bus;

a chassis, and said optical sensor is affixed to said chassis; and a thumbpad, said thumbpad attached to said chassis, and said thumbpad generating and transmitting a pressure report to said USB computer, and said USB computer generating a formatted report specifying said pressure report, and said USB computer transmitting said formatted report to the host computer via said USB bus.

6. The optical gun of claim 5, wherein said optical gun further comprises a second thumbpad, said second thumbpad generating and transmitting a second pressure report to said universal serial bus compliant computer, and said universal serial bus compliant computer generating a second formatted report specifying said second pressure report, and said universal serial bus compliant computer transmitting said second formatted report to the host computer via said universal serial bus whereby the game computer system provides said thumbpad and said second thumbpad as a pair of separate gaming inputs to a computer game.

7. An optical gun for use by a game player in combination with a computer game system, the computer game system having a host computer and video screen and the computer game system running a computer software game, and the host computer having an analog game port, said optical gun comprising:

a universal serial bus compliant computer;

an optical sensor, said optical sensor detecting an illumination of a position located on the video screen, and said optical sensor transmitting a detection time signal to said universal serial bus compliant computer, said detection time signal containing information indicating a time of occurrence of detection of the screen position illumination;

a universal serial bus, said universal serial bus providing a bi-directional signal and power pathway between said universal serial bus compliant computer and the host computer;

a video sampling cable, said video sampling cable receiving video screen data from the host computer and transmitting the video screen data to the video screen, and said universal serial bus compliant computer comparing a pixel illumination sequence of the video screen data with said time of occurrence of detection of the illumination as specified in said detection time signal, and determining therefrom the position of the video screen wherefrom said optical sensor detected the illumination, and said universal serial bus compliant computer generating a formatted report specifying the position, and said universal serial bus compliant computer transmitting said formatted report to the host computer via said universal serial bus;

a chassis, and said optical sensor is affixed to said chassis;

an analog thumbpad, said analog thumbpad generating a pressure report to said universal serial bus compliant computer, said universal serial bus compliant computer generating a formatted report specifying said pressure report; and an analog signal line, said analog signal line providing an electrical signal pathway from said universal serial bus compliant computer and to the analog game port, and said universal serial bus compliant computer transmitting said formatted signal to the host computer via said analog signal line.

8. An optical gun for use by a game player in combination with a computer game system, the computer game system having a host computer and a video screen and the computer game system running a computer software game, said optical gun comprising:

a universal serial bus compliant computer;

an optical sensor, said optical sensor detecting an illumination of a position located on the video screen, and said optical sensor transmitting a detection time signal to said universal serial bus compliant computer, said detection time signal containing information indicating a time of occurrence of detection of the screen position illumination;

a universal serial bus, said universal serial bus providing a bi-directional signal and power pathway between said universal serial bus compliant computer and the host computer;

a video sampling cable, said video sampling cable receiving video screen data from the host computer and transmitting the video screen data to the video screen, and said universal serial bus compliant computer comparing a pixel illumination sequence of the video screen data with said time of occurrence of detection of the illumination as specified in said detection time signal, and determining therefrom the position of the video screen wherefrom said optical sensor detected the illumination, and said universal serial bus compliant computer generating a formatted report specifying the position, and said universal serial bus compliant computer transmitting said formatted report to the host computer via said universal serial bus;

a chassis, and said optical sensor is affixed to said chassis; and a watchdog circuit, said watchdog circuit periodically receiving a reset signal from said universal serial bus compliant computer, and said watchdog circuit initiating an enumeration of said optical gun when said reset signal is not received from said universal serial bus compliant computer within a prespecified period of time.

* * * * *